United States Patent
Jung

(10) Patent No.: US 11,789,710 B2
(45) Date of Patent: Oct. 17, 2023

(54) COMPILATION METHOD AND APPARATUS WITH NEURAL NETWORK

(71) Applicant: SAMSUNG ELECTRONICS CO., LTD., Suwon-si (KR)

(72) Inventor: Hanwoong Jung, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 35 days.

(21) Appl. No.: 17/691,679

(22) Filed: Mar. 10, 2022

(65) Prior Publication Data

US 2023/0091392 A1 Mar. 23, 2023

(30) Foreign Application Priority Data

Sep. 17, 2021 (KR) .................. 10-2021-0125072

(51) Int. Cl.
*G06F 8/41* (2018.01)
*G06N 3/10* (2006.01)

(52) U.S. Cl.
CPC .............. *G06F 8/443* (2013.01); *G06F 8/451* (2013.01); *G06N 3/10* (2013.01)

(58) Field of Classification Search
CPC ............ G06N 3/10; G06F 8/451; G06F 8/443
See application file for complete search history.

(56) References Cited

U.S. PATENT DOCUMENTS

| | | | |
|---|---|---|---|
| 9,760,346 B2 | 9/2017 | Villadsen et al. | |
| 10,691,432 B1 | 6/2020 | Pupilli et al. | |
| 11,023,360 B2 | 6/2021 | Gu et al. | |
| 11,461,662 B1* | 10/2022 | Zheng | G06N 3/08 |
| 2019/0303743 A1* | 10/2019 | Venkataramani | G06N 3/084 |
| 2019/0340010 A1 | 11/2019 | Lee et al. | |
| 2019/0391796 A1* | 12/2019 | Brady | G06F 8/458 |
| 2019/0392296 A1* | 12/2019 | Brady | G06N 3/063 |
| 2020/0151088 A1 | 5/2020 | Gu et al. | |
| 2020/0218523 A1 | 7/2020 | Pupilli et al. | |

(Continued)

FOREIGN PATENT DOCUMENTS

| CN | 110908667 A | 3/2020 |
|---|---|---|
| CN | 111191778 A | 5/2020 |

(Continued)

OTHER PUBLICATIONS

Xie et al., "Optimization and Parallelization" (Year: 2019).*

(Continued)

*Primary Examiner* — Phillip H Nguyen
(74) *Attorney, Agent, or Firm* — NSIP Law

(57) ABSTRACT

A compile method for a neural network, the compile method includes receiving data related to the neural network, generating a grouped layer by grouping layers comprised in the neural network based on the data, generating a set of passes executable in parallel based on a dependency between a plurality of passes to process the neural network, generating a set of threads performing a plurality of optimization functions based on whether optimization operations performed by the optimization functions is performed independently for the layers, respectively, or sequentially based on a dependency between the layers, and performing compilation in parallel based on the grouped layer, the set of passes, and the set of threads.

19 Claims, 18 Drawing Sheets

(56) References Cited

U.S. PATENT DOCUMENTS

| | | | |
|---|---|---|---|
| 2021/0149717 A1* | 5/2021 | Li | G06F 9/4881 |
| 2022/0012575 A1* | 1/2022 | Fok | G06F 9/3016 |
| 2023/0083345 A1* | 3/2023 | Kelur | G06N 3/04 |
| | | | 706/21 |

FOREIGN PATENT DOCUMENTS

| | | |
|---|---|---|
| CN | 111860816 A | 10/2020 |
| CN | 112465133 A | 3/2021 |
| KR | 10-2020-0053318 A | 5/2020 |
| KR | 10-2020-0093105 A | 8/2020 |

OTHER PUBLICATIONS

Rotem et al., "Glow: Graph Lowering Compiler Techniques for Neural Networks" (Year: 2019).*

Song et al., "Compiling Optimization for Neural Network Accelerators" (Year: 2019).*

Baek et al., "A Multi-Neural Network Acceleration Architecture" (Year: 2020).*

Chen et al., "Partition and Scheduling Algorithms for Neural Network Accelerators" (Year: 2019).*

\* cited by examiner

- DRAM(Blob(e1)) = 0x10000 / SRAM (Blob(e1)) = 0x800
- DRAM(Blob(e2)) = 0x20000 / SRAM (Blob(e2)) = 0x1600

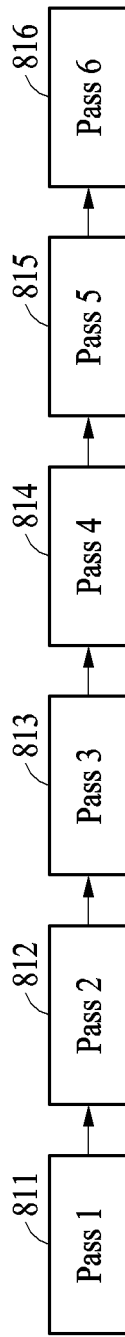

Example of partial compile

COMPILATION METHOD AND APPARATUS WITH NEURAL NETWORK

CROSS-REFERENCE TO RELATED APPLICATIONS

This application claims the benefit under 35 USC § 119(a) of Korean Patent Application No. 10-2021-0125072, filed on Sep. 17, 2021, in the Korean Intellectual Property Office, the entire disclosure of which is incorporated herein by reference for all purposes.

BACKGROUND

1. Field

The following description relates to a compilation method and apparatus for neural networks.

2. Description of Related Art

To perform and compile a neural network in a target device, a conventional compile method gradually generates target execution binary by sequentially passing functions, including a function required for compiling the given neural network as a whole.

When performing caching on a previous compilation result to reduce compile time, the conventional compile method stores binary by performing compilation layer-by-layer, and then, outputs the stored binary without performing compilation in response to receiving a request for compiling on the same layer.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a compile method for a neural network, the compile method includes receiving data related to the neural network, generating a grouped layer by grouping layers comprised in the neural network based on the data, generating a set of passes executable in parallel based on a dependency between a plurality of passes to process the neural network, generating a set of threads performing a plurality of optimization functions based on whether optimization operations performed by the optimization functions is performed independently for the layers, respectively, or sequentially based on a dependency between the layers, and performing compilation in parallel based on the grouped layer, the set of passes, and the set of threads.

The generating of the grouped layer may include generating the grouped layer based on the dependency between the layers.

The generating of the grouped layer based on the dependency between the layers may include generating the grouped layer by combining layers having dependency among the layers.

The performing of the compiling may include generating an intermediate representation (IR) by compiling the grouped layer, and inserting the IR when compiling a second top-level network of the neural network.

The generating of the set of passes may include combining passes having no dependency among the passes.

The generating of the set of threads may include parallelizing neural network operations in response to a portion of the layers having dependency, and parallelizing each of the layers sequentially in response to the layers having no dependency.

The generating of the set of threads may include performing pass fusing on the passes of the layers having no dependency.

The generating of the set of threads may include applying multi-threading to an operation of weight compression of the neural network or an operation of weight preprocessing of the neural network.

In response to a change in a portion of the layers, the compile method may further include performing recompiling on a grouped layer including the portion of the layers.

In another general aspect, a compile apparatus for a neural network, the compile apparatus includes a receiver configured to receive data related to the neural network, and a processor configured to generate a grouped layer by grouping layers comprised in the neural network based on the data, generate a set of passes executable in parallel based on dependency between a plurality of passes to process the neural network, generate a set of threads performing a plurality of optimization functions based on whether optimization operations performed by the optimization functions is performed independently for the layers, respectively, or sequentially based on dependency between the layers, and perform compilation in parallel based on the grouped layer, the set of passes, and the set of threads.

The processor may be further configured to generate the grouped layer based on the dependency between the layers.

The processor may be further configured to generate the grouped layer by combining layers having a dependency among the layers.

The processor may be further configured to generate an intermediate representation (IR) by compiling the grouped layer, and perform compilation by inserting the IR when compiling a second top-level network of the neural network.

The processor may be further configured to generate the set of passes by combining passes having no dependency among the passes.

The processor may be further configured to generate the set of threads by parallelizing neural network operations in response to a portion of the layers having a dependency, and generate the set of threads by parallelizing each of the layers sequentially in response to the layers having no dependency.

The processor may be further configured to perform pass fusing on the passes of the layers having no dependency.

The processor may be further configured to generate the set of threads by applying multi-threading to an operation of weight compression of the neural network or an operation of weight preprocessing of the neural network.

In response to a change in a portion of the layers, the processor may be configured to perform recompiling on a grouped layer including the portion of the layers.

Other features and aspects will be apparent from the following detailed description, the drawings, and the claims.

BRIEF DESCRIPTION OF THE DRAWINGS

FIG. 7 illustrates an example of an intermediate representation (IR).

FIG. 8 illustrates an example of a pass chain.

FIG. 9 illustrates an example of a pass configuration.

Figure 1:
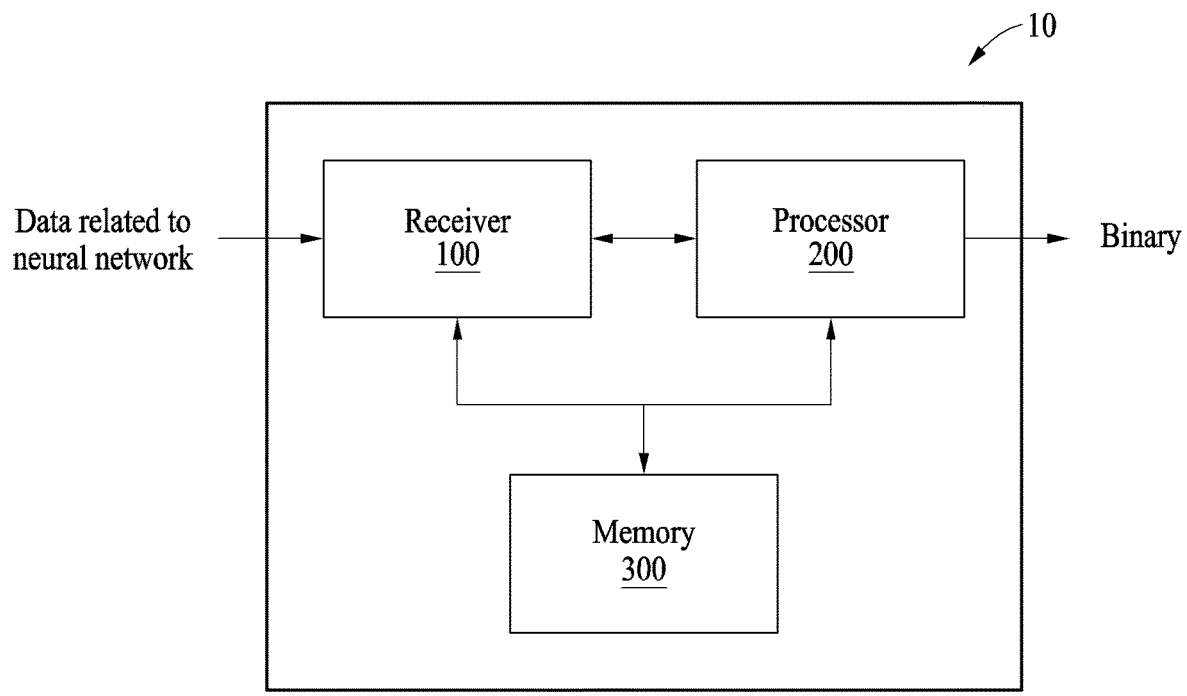
FIG. 1 illustrates an example of a compile apparatus.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

FIG. 1 illustrates an example of a compile apparatus.

Referring to FIG. 1, a compile apparatus 10 may perform compilation on a neural network. The compile apparatus 10 may perform language translation to translate a document written in a predetermined programming language into another programming language. The compile apparatus 10 may convert a high-level programming language into a lower-level programming language. Herein, it is noted that use of the term 'may' with respect to an example or embodiment, e.g., as to what an example or embodiment may include or implement, means that at least one example or embodiment exists where such a feature is included or implemented while all examples and embodiments are not limited thereto.

The neural network may be a general model that has an ability to solve a problem, where artificial neurons (nodes) forming the network through synaptic combinations change the connection strength of synapses through training.

The neurons of the neural network may include a combination of weights or biases. The neural network may include one or more layers each including one or more neurons or nodes. The neural network may infer a desired result from a predetermined input by changing the weights of the neurons through training.

The neural network may include a deep neural network (DNN). The neural network may include a convolutional neural network (CNN), a recurrent neural network (RNN), a perceptron, a multiplayer perceptron, a feed forward (FF), a radial basis network (RBF), a deep feed forward (DFF), a long short-term memory (LSTM), a gated recurrent unit (GRU), an auto encoder (AE), a variational auto encoder (VAE), a denoising auto encoder (DAE), a sparse auto encoder (SAE), a Markov chain (MC), a Hopfield network (HN), a Boltzmann machine (BM), a restricted Boltzmann machine (RBM), a deep belief network (DBN), a deep convolutional network (DCN), a deconvolutional network (DN), a deep convolutional inverse graphics network (DCIGN), a generative adversarial network (GAN), a liquid state machine (LSM), an extreme training machine (ELM), an echo state network (ESN), a deep residual network (DRN), a differentiable neural computer (DNC), a neural turning machine (NTM), a capsule network (CN), a Kohonen network (KN), and an attention network (AN).

The compile apparatus 10 may be included in a personal computer (PC), a data server, or a portable device.

The portable device may be implemented as a laptop computer, a mobile phone, a smart phone, a tablet PC, a mobile internet device (MID), a personal digital assistant (PDA), an enterprise digital assistant (EDA), a digital still camera, a digital video camera, a portable multimedia player (PMP), a personal navigation device or portable navigation device (PND), a handheld game console, an e-book, or a smart device. The smart device may be implemented as a smart watch, a smart band, or a smart ring.

In case of a neural network being processed using a multi-core processor, the compile apparatus 10 may perform compilation in parallel using compile parallelism, layer parallelism, and data parallelism. The compile apparatus 10 may improve compile speed by performing compilation in parallel.

The compile apparatus 10 may include a receiver 100 and a processor 200. The compile apparatus 10 may further include a memory 300.

The receiver 100 may receive data related to a neural network. The receiver 100 may include a receiving interface. The receiver 100 may output received data to the processor 200. The data related to the neural network may include a model parameter (or, a weight) of the neural network, data input to the neural network, data output from the neural network, training data, or compile-related information. The compile-related information may include pass information.

The processor 200 may process data stored in the memory 300. The processor 200 may execute a computer-readable code (for example, software) stored in the memory 300 and instructions triggered by the processor 200.

The processor 200 may be a data processing device implemented by hardware, including a circuit having a physical structure to perform desired operations. For example, the desired operations may include code or instructions included in a program.

For example, the hardware-implemented data processing device may include a microprocessor, a central processing unit (CPU), a processor core, a multi-core processor, a multiprocessor, an application-specific integrated circuit (ASIC), and a field-programmable gate array (FPGA).

The processor 200 may generate a grouped layer by grouping layers included in a neural network based on the data related to the neural network. The processor 200 may generate a grouped layer based on dependency between layers. The dependency between layers is further described in detail with reference to FIG. 4. The processor 200 may generate a grouped layer by combining layers having dependencies.

The processor 200 may generate a set of passes executable in parallel based on dependencies between a plurality of passes to process the neural network. The set of passes may be generated by combining passes having no dependency. The dependency of passes is further described in detail with reference to FIGS. 8 to 10.

The processor 200 may generate a set of threads performing a plurality of optimization functions based on whether optimization operations performed by the optimization functions may be performed independently for the layers, respectively, or whether they need to be performed sequentially based on dependency between the layers. In response to a portion of the layers having dependency, the processor 200 may generate a set of threads by parallelizing neural network operations. A thread may be a unit of flow executed in a predetermined program or a process.

In response to layers having no dependency, the processor 200 may generate a set of threads by parallelizing the layers, layer-by-layer. In response to layers having no dependency, the processor 200 may perform pass fusing for the passes. The processor 200 may generate a set of threads by applying multi-threading to an operation of weight compression of a neural network or an operation of weight preprocessing of the neural network.

The processor 200 may perform compilation in parallel based on the grouped layer, the set of passes, and the set of threads. The processor 200 may generate an intermediate representation (IR) by compiling the grouped layer.

The processor 200 may perform optimization in the grouped layer, and by performing recompiling on a second top-level network, may also perform scheduling between grouped layers and optimization for a connection point between the grouped layers. Through this process, the processor 200 may perform without missing a chance to optimize that may be missed because of group-based compiling.

The processor 200 may perform compilation by inserting the generated IR when compiling the second top-level network of the neural network. For example, a (virtual) layer may include a low-level network already compiled in compiling the second top-level network. The layer including the low-level network may include an IR of the low-level network.

In response to a change in a portion of the layers, the processor 200 may recompile a grouped layer, including the portion of the layers.

The memory 300 may store data for an operation or an operation result. The memory 300 stores instructions (or programs) executable by the processor 200. For example, the instructions may include instructions for executing an operation of the processor and/or instructions for operating each component of the processor.

The memory 300 may be implemented as a volatile or non-volatile memory device.

The volatile memory device may be implemented as a dynamic random-access memory (DRAM), a static random-access memory (SRAM), a thyristor RAM (T-RAM), a zero capacitor RAM (Z-RAM), or a twin transistor RAM (TTRAM).

The non-volatile memory device may be implemented as an electrically erasable programmable read-only memory (EEPROM), a flash memory, a magnetic RAM (MRAM), a spin-transfer torque (STT)-MRAM, a conductive bridging RAM (CBRAM), a ferroelectric RAM (FeRAM), a phase change RAM (PRAM), a resistive RAM (RRAM), a nanotube RRAM, a polymer RAM (PoRAM), a nano floating gate Memory (NFGM), a holographic memory, a molecular electronic memory device), or an insulator resistance change memory.

Figure 2:
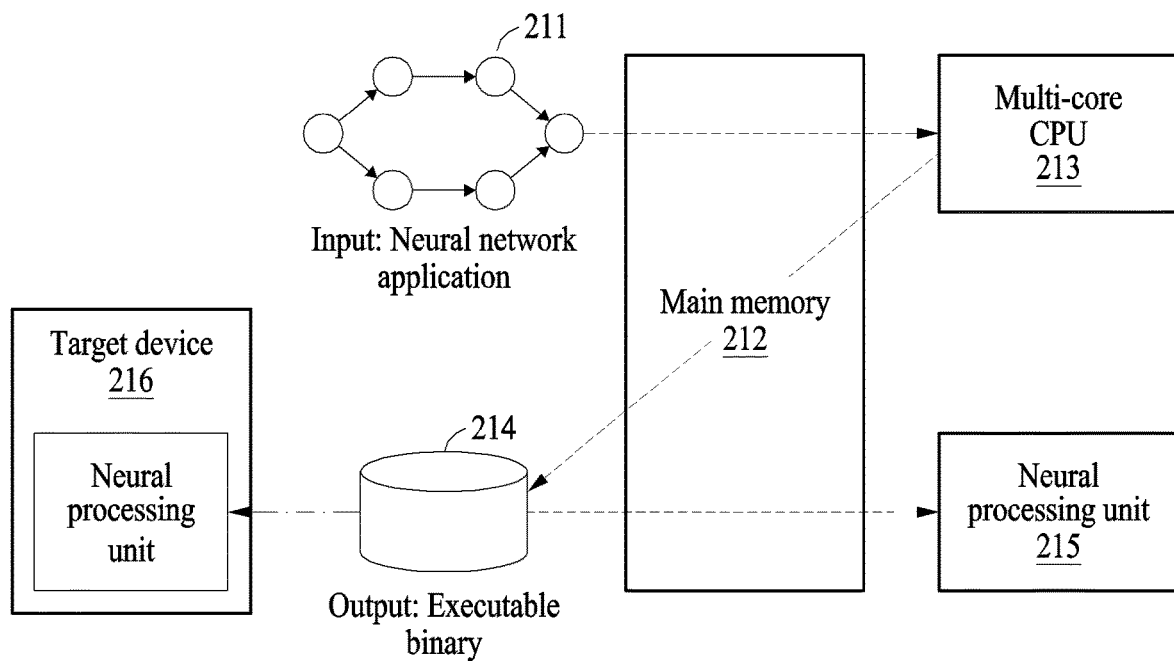
FIG. 2 illustrates an example of an operation of the compile apparatus of FIG. 1.

FIG. 2 illustrates an example of an operation of the compile apparatus of FIG. 1.

Referring to FIG. 2, a compile apparatus (for example, the compile apparatus 10 of FIG. 1) may be implemented in a host or target device.

In a cross-compile environment, the compile apparatus 10 may be implemented in a host personal computer (PC) to perform compilation, generate binary, and transmit the generated binary to the target device. The binary may refer to data encoded in binary format to be stored and processed in a computer as a computer file.

The host PC may include a main memory 212, a multi-core CPU 213, and a neural processing unit (NPU) 215. The multi-core CPU 213 may perform compilation by receiving a neural network application via the main memory 212.

The NPU 215 may process an operation related to a neural network 211 based on executable binary.

Alternatively, the compile apparatus 10 may be implemented in a target device 216. The compile apparatus 10 may generate binary 214 by performing compilation inside the target device 216, and the generated binary 214 may be executed through an NPU inside the target device 216.

Hereinafter, compiling operations in parallel is described with reference to FIGS. 3 to 11.

Figure 3:
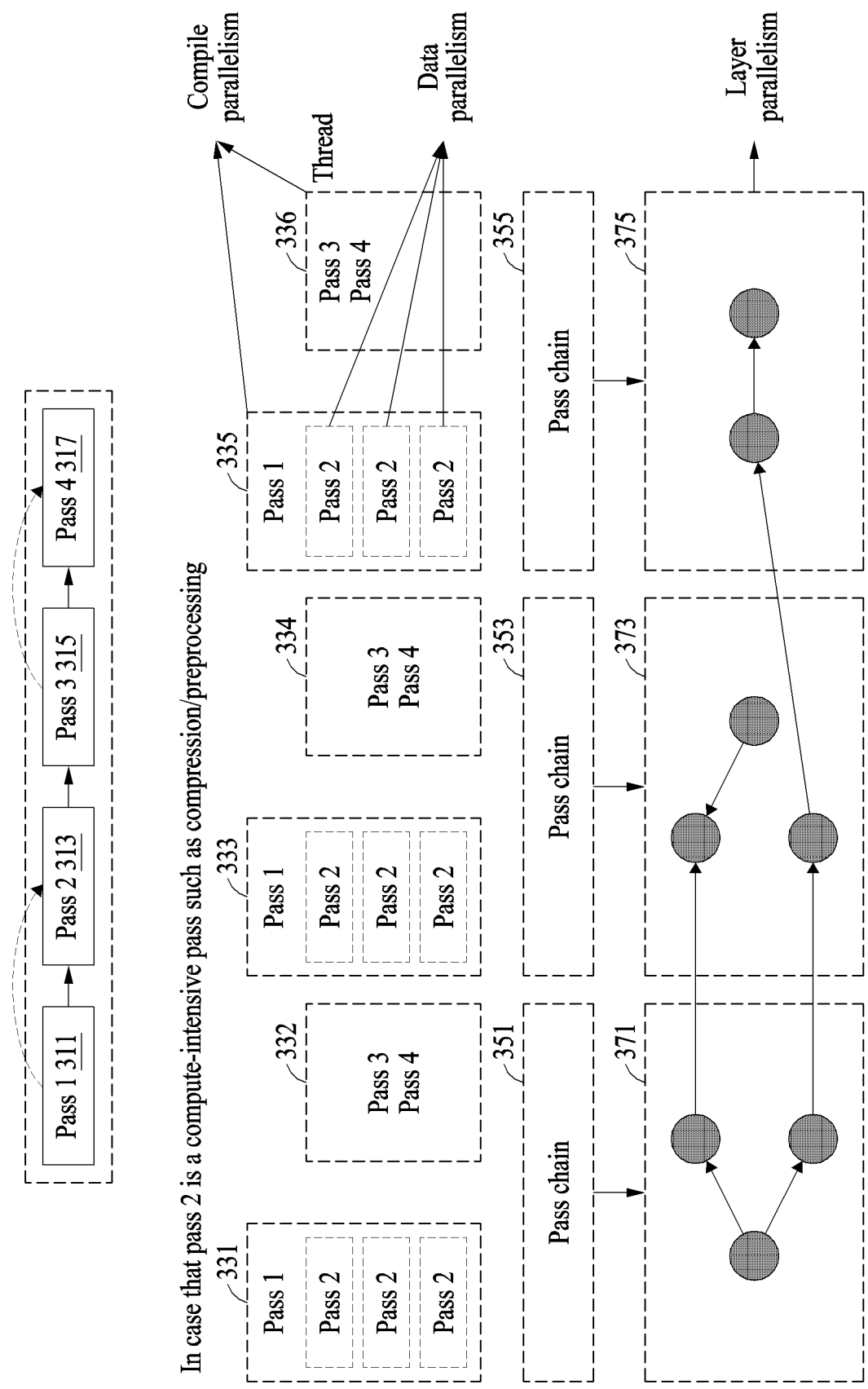
FIG. 3 illustrates an example of a compilation operation using diverse parallelism.

FIG. 3 illustrates an example of a compilation operation using diverse parallelism.

Referring to FIG. 3, a processor (for example, the processor 200 of FIG. 1) may perform compilation in parallel. The processor 200 may perform compilation in parallel using at least one of compile parallelism, data parallelism, and layer parallelism.

The processor 200 may improve compile speed by utilizing compile parallelism, data parallelism, and layer parallelism simultaneously or individually.

The processor 200 may process a pass to process a neural network. The pass may include a function used for implementing optimization and a function required for compiling.

The processor 200 may execute a plurality of passes 311, 313, 315, and 317. The processor 200 may generate a set of passes 331, 332, 333, 334, 335, and 336 executable in parallel based on dependency between the plurality of passes 311, 313, 315, and 317.

The processor 200 may perform parallelization through multi-threading on a compute-intensive pass. For example, in a response to a pass 2, which is a compute-intensive pass such as compressing or preprocessing a parameter (for example, a weight) of a neural network, parallel compilation may be performed using data parallelism by applying the multi-threading to the pass 2.

The processor 200 may perform compilation in parallel using compile parallelism. The processor 200 may generate a plurality of pass chains 351, 353, and 355 based on dependency between passes.

The processor 200 may perform compilation in parallel based on layer parallelism. The processor 200 may generate a set of layers 371, 373, and 375 based on dependency between a plurality of layers.

Figure 4:
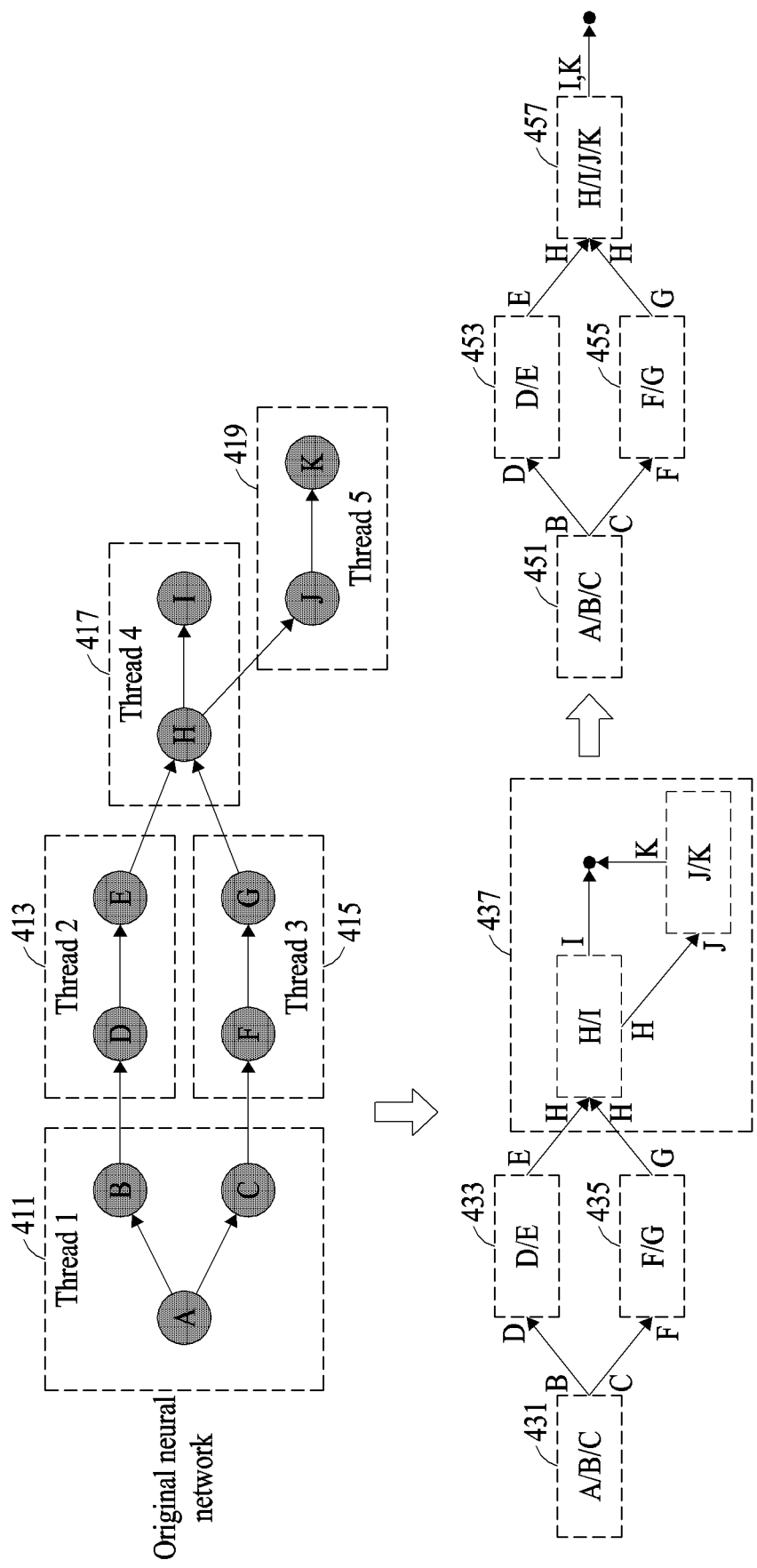
FIG. 4 illustrates an example of a compilation operation using layer parallelism.
Figure 5:
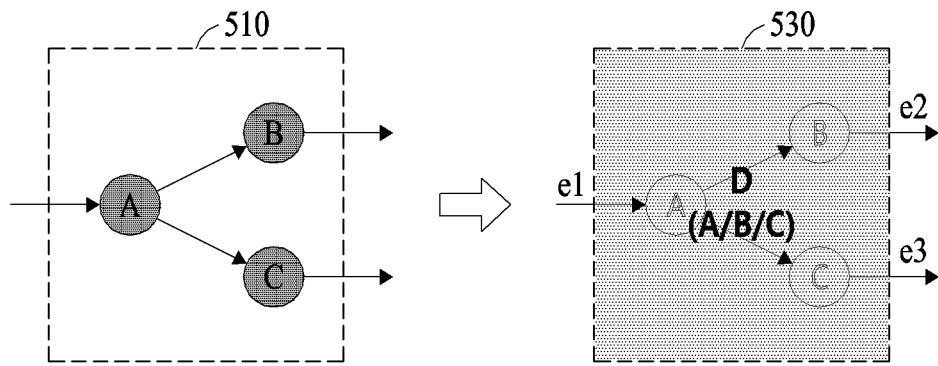
FIG. 5 illustrates an example of grouping layers.
Figure 6:
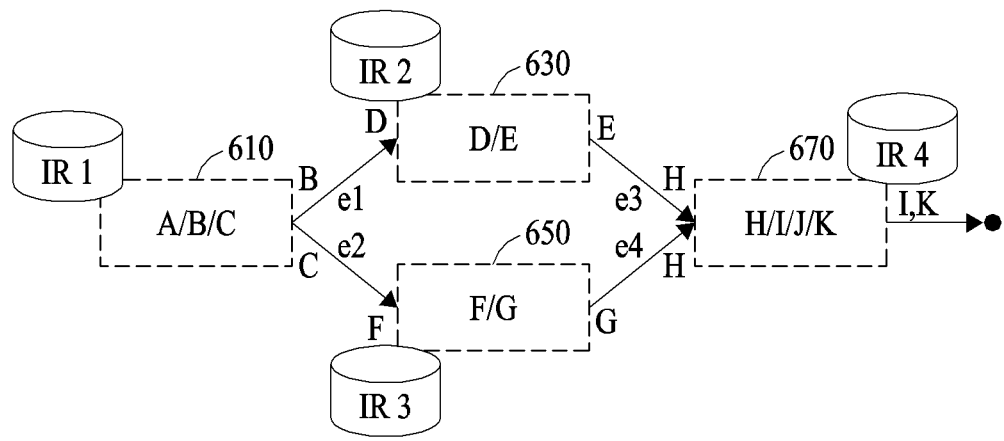
FIG. 6 illustrates an example of a compilation operation of a grouped neural network.

FIG. 4 illustrates an example of a compilation operation using layer parallelism, and FIG. 5 illustrates an example of grouping layers. FIG. 6 illustrates an example of compiling a grouped neural network, and FIG. 7 illustrates an example of an intermediate representation (IR).

Referring to FIGS. 4 to 7, a processor (for example, the processor 200 of FIG. 1) may generate a grouped layer by grouping layers included in a neural network based on data related to the neural network. The processor 200 may generate a grouped layer based on dependency between layers. The processor 200 may generate a grouped layer by combining layers having a dependency.

The dependency between the layers may be determined based on whether an order is required in an operation of the layers. In response to layers having dependency, a portion of the layers may need to be processed before other layers. In response to layers having no dependency, the layers may be processed in parallel regardless of a processing order between the layers.

In an example of FIG. 4, an original neural network may be processed using threads 1 411, 2 413, 3 415, 4 417, and 5 419. The thread 1 411 may include layers A, B, and C. The thread 2 413 may include layers D and E. The thread 3 415 may include layers F and G. The thread 4 417 may include layers H and I, and the thread 5 419 may include layers J and K.

The processor 200 may perform primary grouping based on dependency between the layers. For example, the processor 200 may generate a plurality of groups 431, 433, 435, and 437 by grouping the layers included in the threads 1 411, 2 413, 3 415, 4 417, and 5 419 respectively.

The processor 200 may generate a plurality of groups 451, 453, 455, and 457 by additionally grouping the group 437 that includes the layers H/I and J/K by performing secondary grouping.

The processor 200 may perform compilation in parallel since the groups generated by grouping have no dependency. The processor 200 may perform compilation by regarding groups as one layer. For example, the processor 200 may optimize a connection portion between the groups by performing scheduling and memory allocation for the groups. The processor 200 may perform optimization on an inception module forward/backward path.

In an example of FIG. 5, the processor 200 may generate a new group 530 by grouping a portion 510 of a neural network that includes a plurality of layers.

Grouped layers may be interpreted in different ways based on input and output edges. For example, an interpretation may be expressed as Dst(e1)=Layer_A, Src(e1)=Layer_B, Src(e1)=Layer_C.

A second top-level network may include a virtual layer enclosing a low-level network. In other words, the virtual layer may be a layer enclosing an operation of the low-level network. The virtual layer may include two or more of "real" layers inside.

The virtual layer may vary depending on a perspective of a feature. For example, in case of an original network "A→B→C→D" of which "B→C" is grouped, a second top-level network may be substituted as represented by "A→E→D (E=B→C)". When B→C is priorly compiled, the IR may be E, and in a process of compiling the next second top-level network, A should see E as B and D should see E as C, and the compiling may be performed properly, the operations apparently being identical The processor 200 may generate IRs by individually performing compiling on generated groups. The processor 200 may perform hierarchical compiling by inserting an IR that is generated when recompiling is performed on a low-level network, as an IR for an operation portion of a corresponding layer or a corresponding group.

For example, as an example of FIG. 6, the processor 200 may generate IRs by performing separate compiling on groups 610, 630, 650, and 670, and may perform hierarchical compiling by inserting the generated IRs.

FIG. 7 may represent an example of an IR generated by the above-described process.

Figure 10:
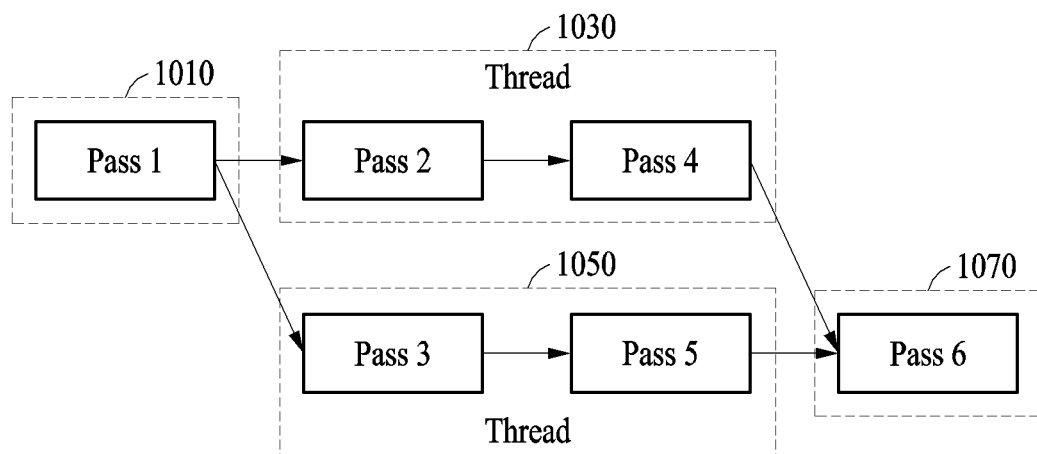
FIG. 10 illustrates an example of a pass dependency graph.

FIG. 8 illustrates an example of a pass chain, FIG. 9 illustrates an example of a pass configuration, and FIG. 10 illustrates an example of a pass dependency graph.

Referring to FIGS. 8 to 10, a processing process of a neural network may include a pass chain configured in a plurality of passes 811, 812, 813, 814, 815, and 816 in a process of compiling.

A processor (for example, the processor 200 of FIG. 1) may generate a set of passes executable in parallel based on dependency between the plurality of passes to process the neural network. The set of passes may be generated by combining passes having no dependency.

The processor 200 may improve compile speed by performing the passes having no dependency in parallel. The processor 200 may perform efficient parallelization using the information on the dependency between passes as a configuration of a compiler. FIG. 9 may represent an example of a pass configuration.

In an example of FIG. 10, the processor 200 may generate a set of passes 1010 including a pass 1 and may generate a set of passes 1030 including passes 2 and 4. The processor 200 may generate a set of passes 1050 including passes 3 and 5, and may generate a set of passes 1070 including a pass 6.

The sets of passes 1030 and 1050 may correspond to threads. The processor 200 may perform compilation in parallel on the threads corresponding to the sets of passes 1030 and 1050.

Figure 11:
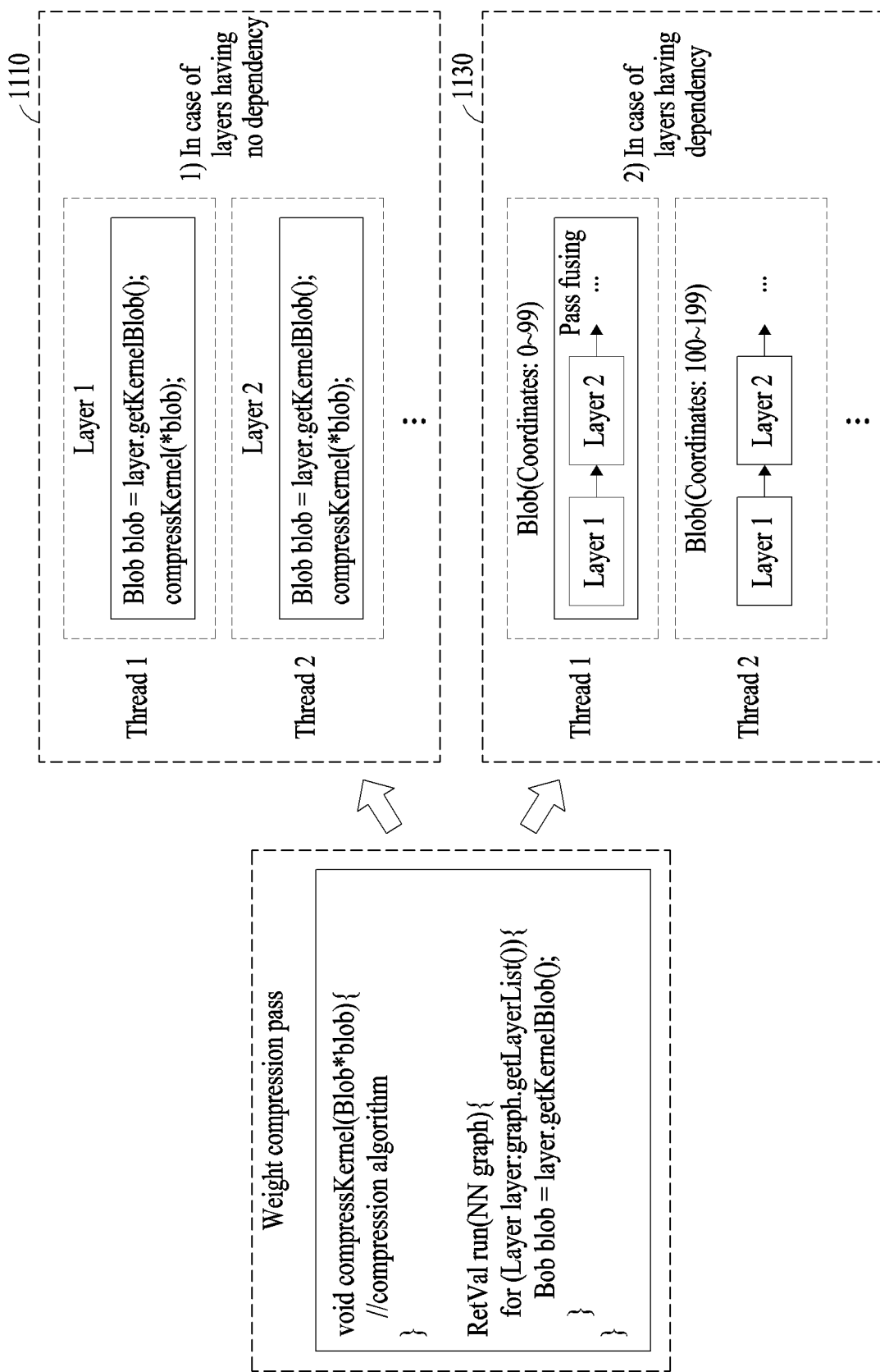
FIG. 11 illustrates an example of a compilation operation using data parallelism.

FIG. 11 illustrates an example of a compilation operation using data parallelism.

Referring to FIG. 11, a processor (for example, the processor 200 of FIG. 1) may generate a set of threads performing a plurality of optimization functions based on whether optimization operations performed by the optimization functions may be performed independently for the layers respectively or whether they need to be performed sequentially based on dependency between layers. In response to a portion of layers having dependency, the processor 200 may generate a set of threads by parallelizing neural network operations. A thread may be a unit of flow executed in a predetermined program or a process.

In response to layers having no dependency, the processor 200 may generate a set of threads by parallelizing the layers in layer-by-layer. In response to layers having no dependency in a unit of the layers, the processor 200 may perform parallelization layer-by-layer. The processor 200 may perform compilation in parallel by applying multi-threading layer-by-layer. For example, in response to layers having no dependency between the layers, the processor 200 may generate a set of threads 1110.

In response to layers having dependency, the processor 200 may parallelize operations. The processor 200 may parallelize loops using OpenMP. For example, the processor 200 may generate a set of threads 1130 in response to layers having dependency between the layers.

In response to layers having no dependency, the processor 200 may perform pass fusing for the passes. The processor 200 may simultaneously perform diverse optimization functions through pass fusing.

The processor 200 may perform parallelization through multi-threading for a compute-intensive implementation such as compressing data of a neural network model, and preprocessing. The processor 200 may generate a set of threads by applying multi-threading to an operation of weight compression of a neural network or an operation of weight preprocessing of the neural network.

The processor 200 may determine a parallelization level considering available CPU resources and a parallelization level required by another parallelism (for example, layer parallelism or compile parallelism).

Figure 12:
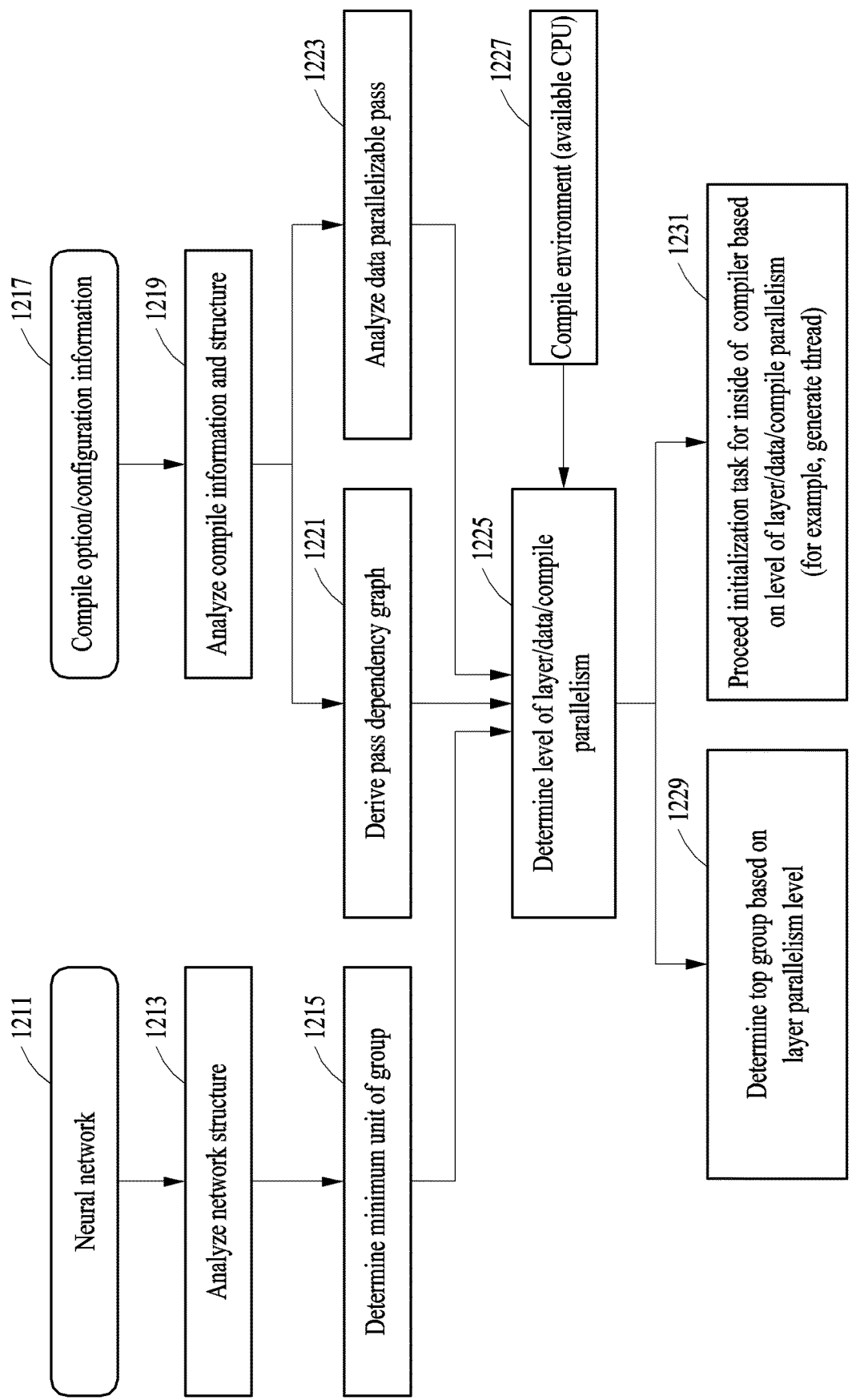
FIG. 12 illustrates a flowchart of performing compilation in parallel.

FIG. 12 illustrates a flowchart of performing compilation in parallel.

Referring to FIG. 12, a processor (for example, the processor 200 of FIG. 1) may perform compilation in parallel based on data related to a neural network.

In operation 1211, the processor 200 may receive data related to a neural network. In operation 1213, the processor 200 may analyze a structure of the neural network. In operation 1215, the processor 200 may determine a minimum unit of a grouped layer for compiling based on the analyzed structure.

In operation 1217, the processor 200 may receive compile option and configuration information. In operation 1219, the processor 200 may analyze compile information and structure based on the compile option and configuration information. In operation 1221, the processor 200 may derive a pass dependency graph based on a result of analyzing the compile information and structure. In operation 1223, the processor 200 may analyze a data parallelizable pass based on the result of analyzing the compile information and structure.

In operation 1225, the processor 200 may determine layer parallelization level, data parallelization level, and compile parallelization level based on a result of analyzing the minimum unit of grouped layer, the pass dependency graph, and the data parallelizable pass. In operation 1227, the processor 200 may determine the parallelization level using compile environment (for example, available CPU) information.

In operation 1229, the processor 200 may determine a top-level group based on the layer parallelization level. In operation 1231, the processor 200 may perform internal initialization (for example, thread generation) of a compiler based on the layer parallelization level and data parallelization level.

Hereinafter, operations of compilation in parallel for neural network processing are described with reference to FIGS. 13 to 17.

Figure 13:
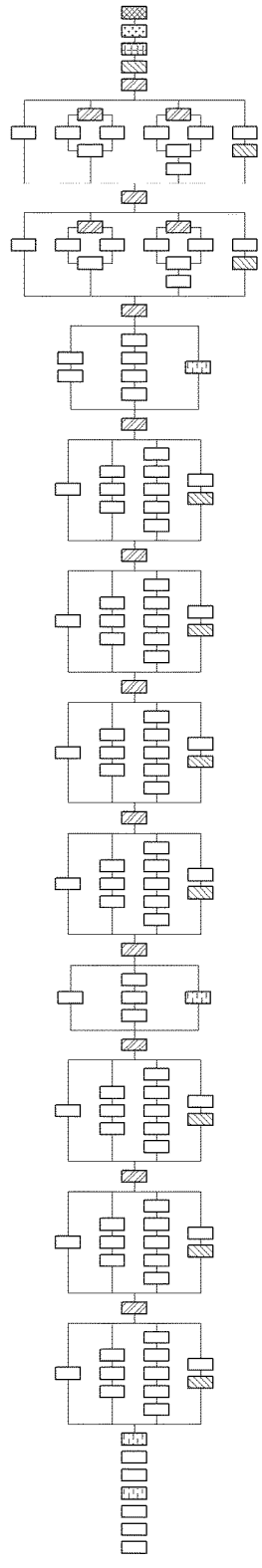
FIG. 13 illustrates an example of a neural network on which parallel compilation is to be performed.
Figure 14:
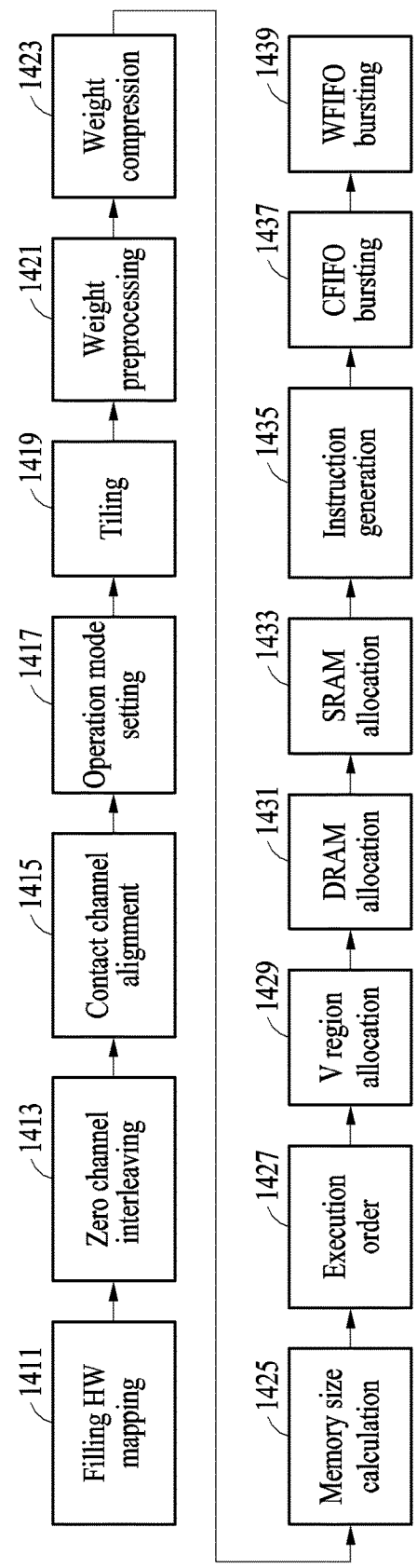
FIG. 14 illustrates an example of a configuration of a compiler before parallelization is performed.
Figure 15:
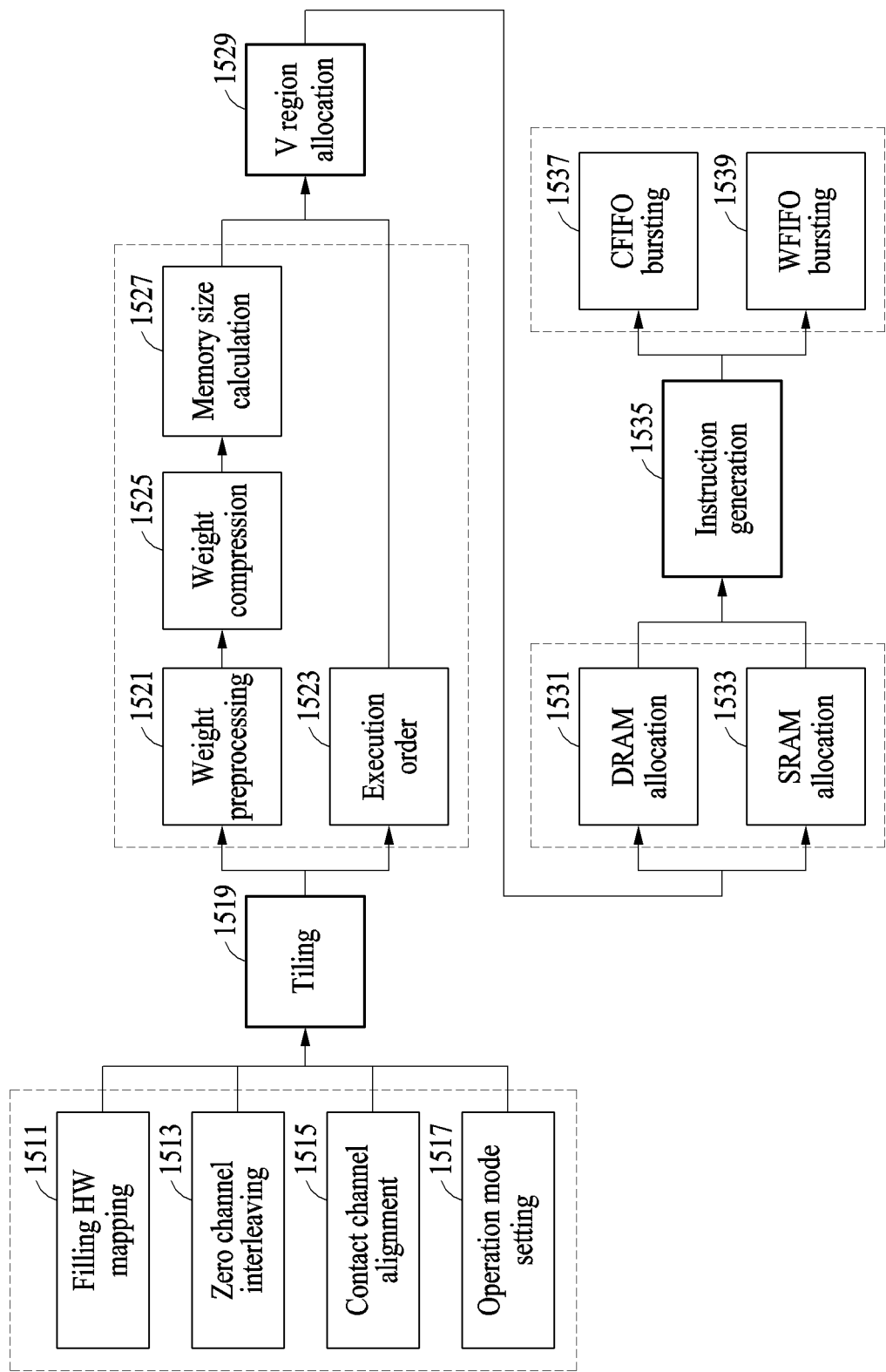
FIG. 15 illustrates an example of a configuration of a compiler to which compile parallelism is applied.
Figure 16:
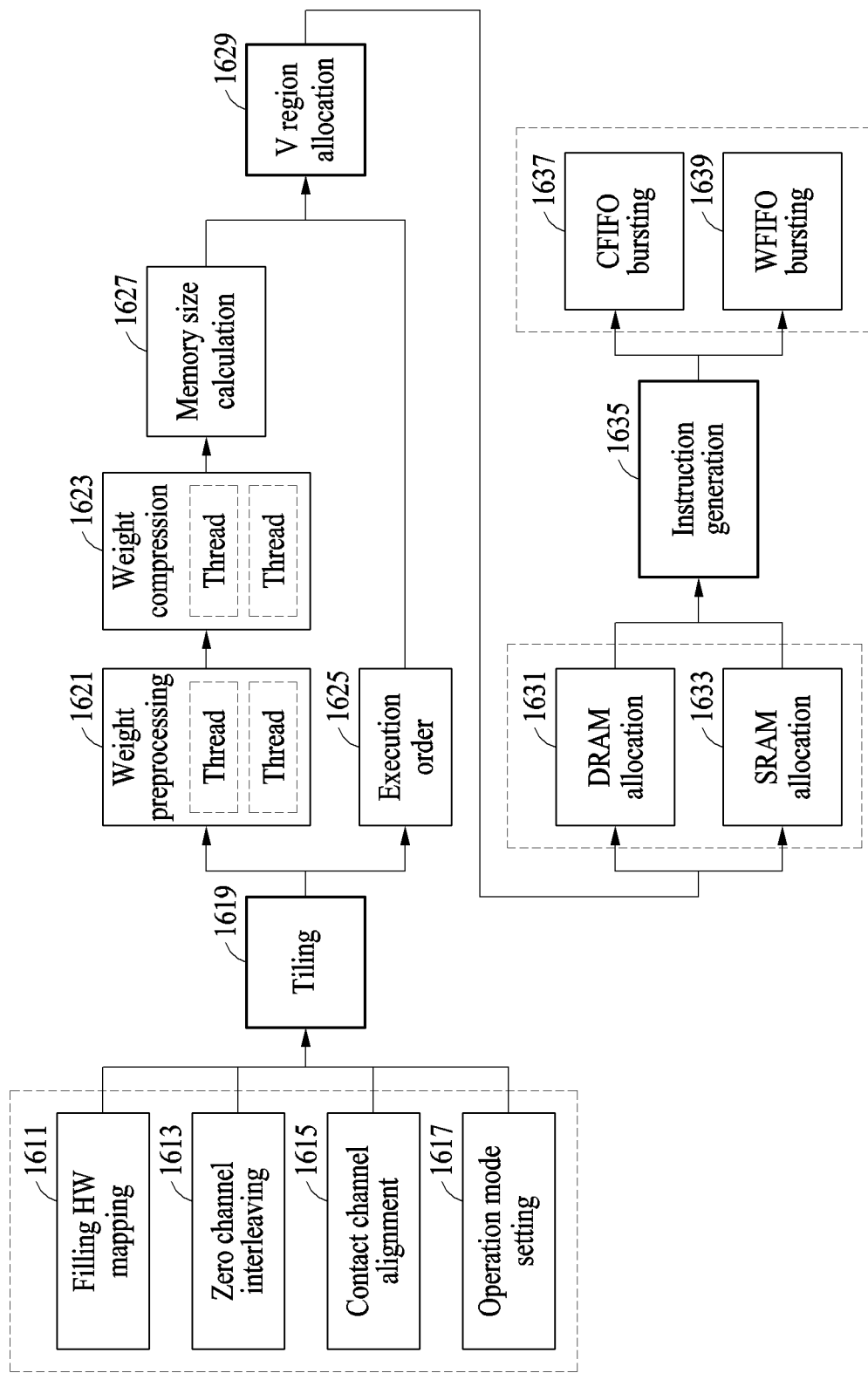
FIG. 16 illustrates an example of a configuration of a compiler to which compile parallelism is applied.
Figure 17:
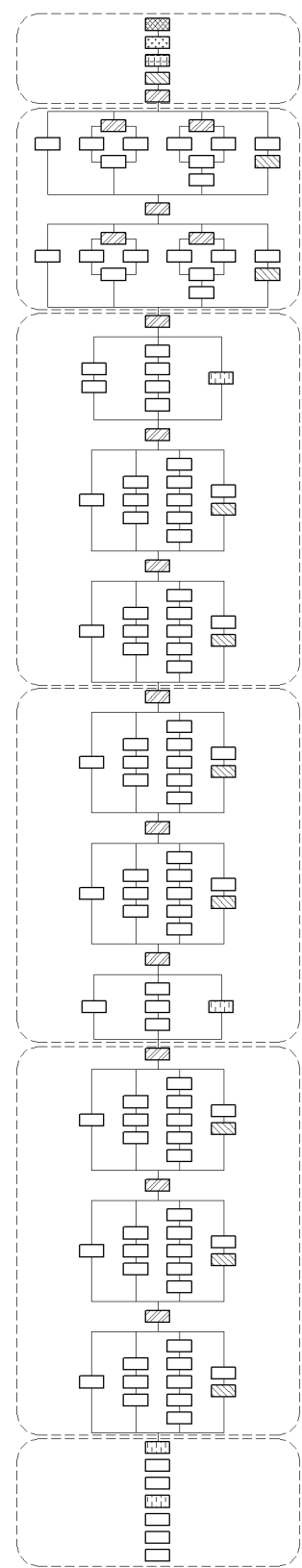
FIG. 17 illustrates an example of a neural network to which layer parallelism is applied.

FIG. 13 illustrates an example of a neural network on which parallel compilation is to be performed and FIG. 14 illustrates an example of a configuration of a compiler before parallelization is performed. FIG. 15 illustrates an example of a configuration of a compiler to which compile parallelism is applied, FIG. 16 illustrates an example of a configuration of a compiler to which compile parallelism is applied, and FIG. 17 illustrates an example of a neural network to which layer parallelism is applied.

Referring to FIGS. 13 to 17, a processor (for example, the processor 200 of FIG. 1) may perform parallel compilation on a neural network. A neural network input to the processor 200 may be the same as FIG. 13.

The processor 200 may perform compilation as FIG. 14 before performing parallelization. The processor 200 may perform filling hardware (HW) mapping 1411, zero channel interleaving 1413, contact channel alignment 1415, operation mode setting 1417, tiling 1419, weight preprocessing 1421, weight compression 1423, memory size calculation 1425, execution order 1427, V region allocation 1429, DRAM allocation 1431, SRAM allocation 1433, instruction generation 1435, constant first input first output (CFIFO) bursting 1437, and weight first input first output (WFIFO) bursting 1439.

The processor 200 may perform compilation in parallel using compile parallelism. In an example of FIG. 15, the processor 200 may perform filling HW mapping 1511, zero channel interleaving 1513, contact channel alignment 1515, and operation mode setting 1517 in parallel.

After the tiling 1519, the processor 200 may perform weight preprocessing 1521, weight compression 1525, and memory size calculation 1527 in parallel with execution order 1523, and may perform V region allocation 1529.

The processor 200 may perform DRAM allocation 1531 and SRAM allocation 1533 in parallel and may perform CFIFO bursting 1537 and WFIFO bursting 1539 in parallel after instruction generation 1535.

In an example of FIG. 16, the processor 200 may perform compilation in parallel using data parallelism. In this case, the processor 200 may perform filling HW mapping 1611, zero channel interleaving 1613, contact channel alignment 1615, operation mode setting 1617, tiling 1619, execution order 1625, V region allocation 1629, DRAM allocation 1631, SRAM allocation 1633, instruction generation 1635, CFIFO bursting 1637, and WFIFO bursting 1639 same as the example of FIG. 15.

The processor 200 may perform compilation in parallel by applying multi-threading to weight preprocessing 1621 and weight compression 1623. The processor 200 may perform memory size calculation 1627 after the weight compression 1623.

The processor 200 may perform compilation in parallel using layer parallelism. An example of FIG. 17 may represent a grouped layer generated based on layer parallelism.

Figure 18:
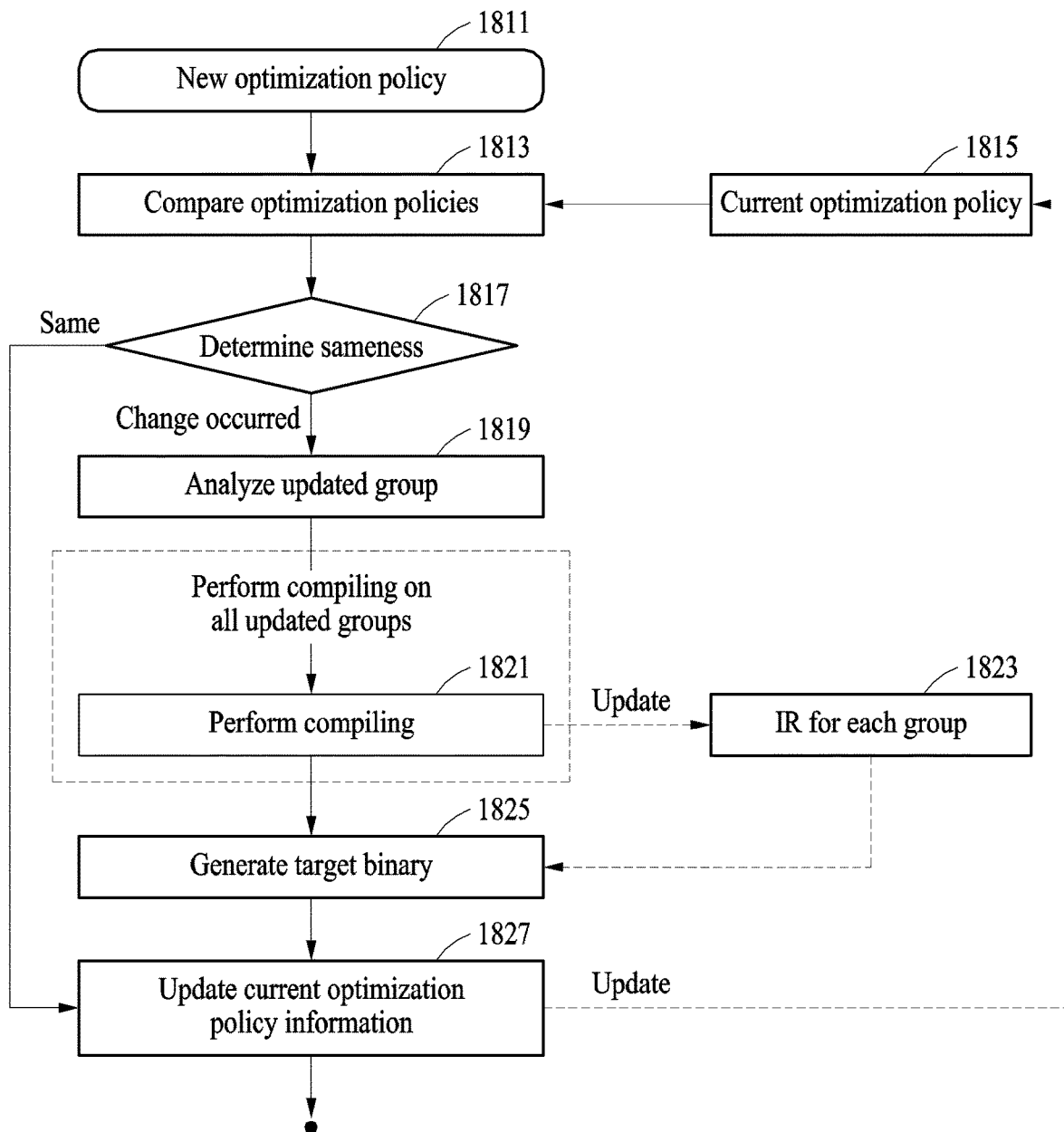
FIG. 18 illustrates an example of a group compilation process in a process of profile-guided optimization.

FIG. 18 illustrates an example of a group compilation process in a process of profile guided optimization.

Referring to FIG. 18, a processor (for example, the processor 200 of FIG. 1) may perform compilation in parallel based on an optimization policy. In operation 1811, the processor 200 may receive a new optimization policy. In operation 1815, the processor 200 may receive a current optimization policy. In operation 1813, the processor 200 may compare the new optimization policy and the current optimization policy.

In operation 1817, the processor 200 may perform determining sameness of optimization policies. If a change is discovered by the sameness determining, in operation 1819, the processor 200 may analyze an updated group. If it is determined by the sameness determining that the policies are identical and unchanged, in operation 1827, the processor 200 may update information on the current optimization policy.

In operation 1821, the processor 200 may perform compilation on all updated groups. In operation 1823, the processor 200 may generate IRs for each group. In operation 1825, the processor 200 may generate target binary. The processor 200 may perform operation 1815 by updating the current optimization policy information.

Figure 19:
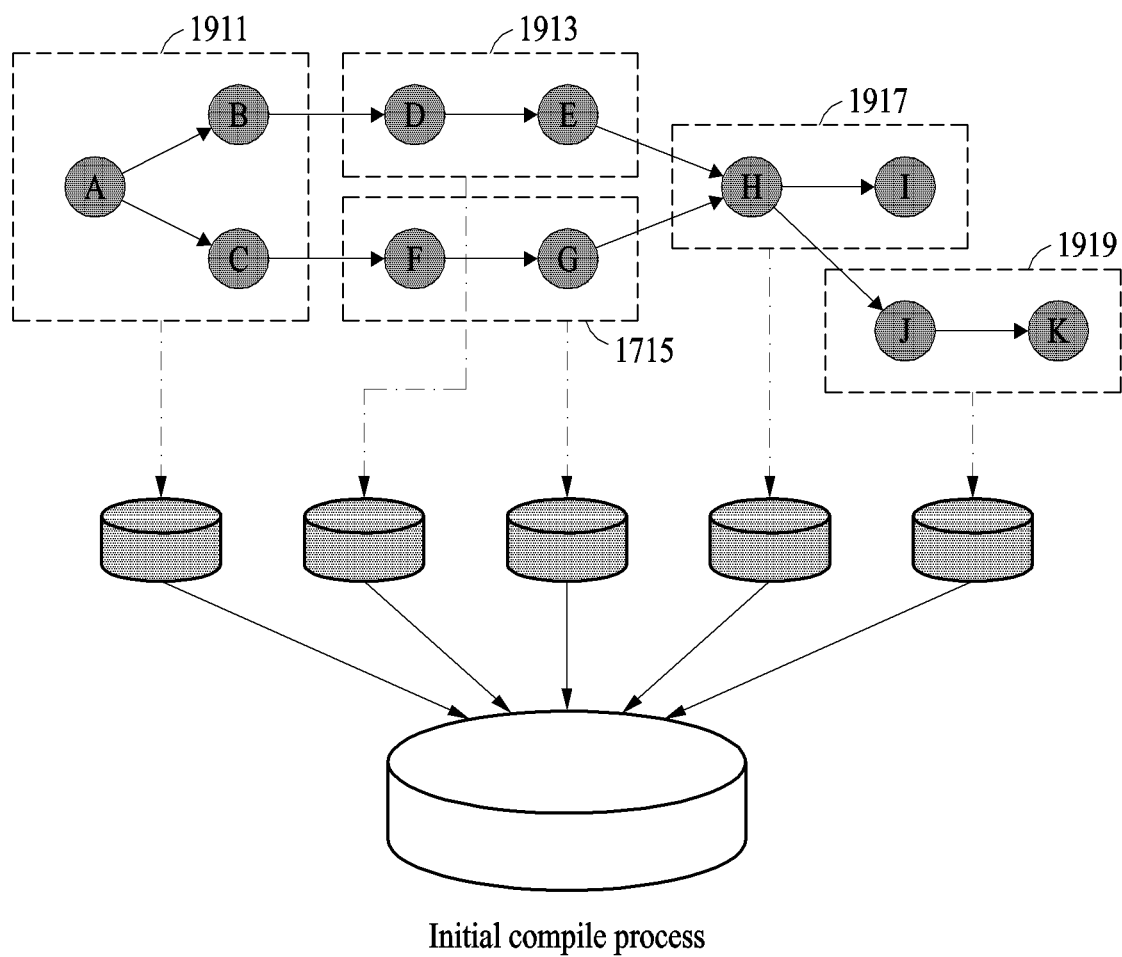
FIG. 19 illustrates an example of an initial compilation process in processing a neural network.
Figure 20:
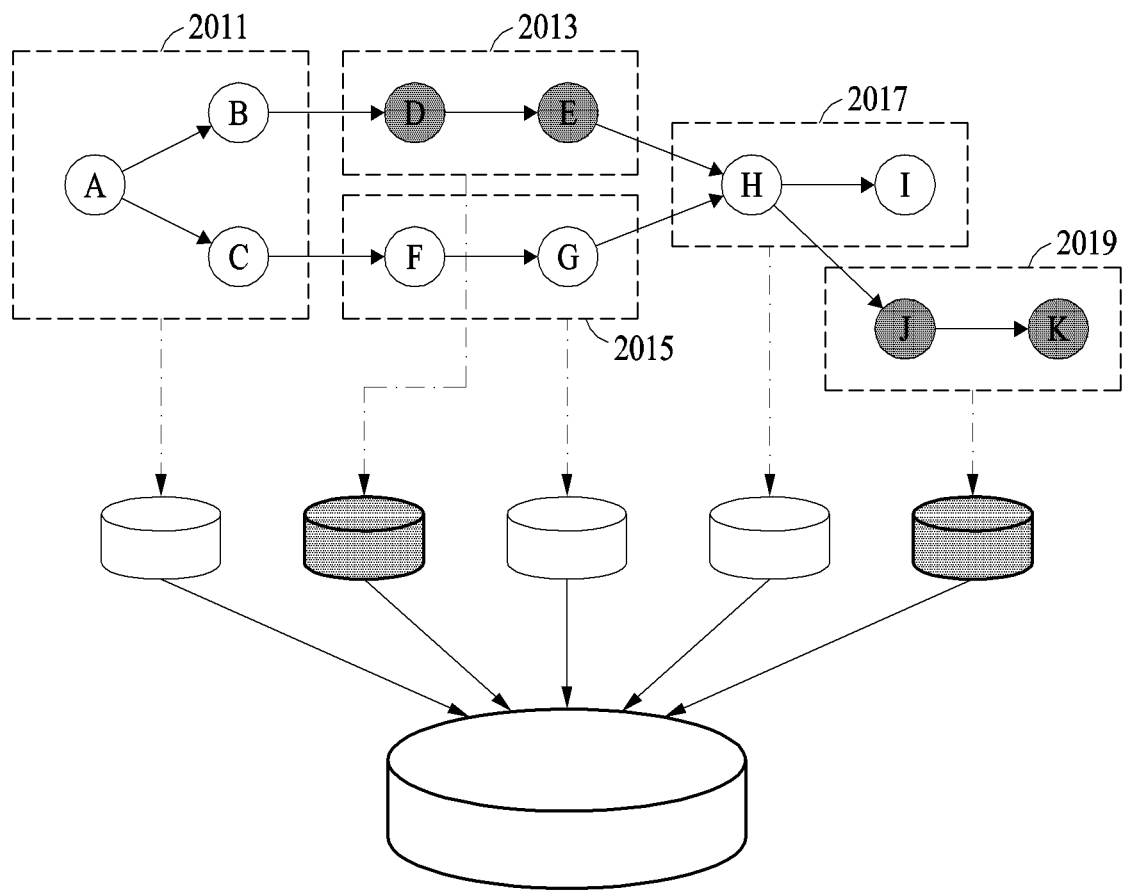
FIG. 20 illustrates an example of a partial compilation process in response to a change in a neural network.

FIG. 19 illustrates an example of an initial compilation process in processing a neural network, and FIG. 20 illustrates an example of a partial compilation process in response to a change in a neural network.

Referring to FIGS. 19 and 20, in response to a change in a portion of layers, a processor (for example, the processor 200 of FIG. 1) may perform recompiling on a group, including the portion of the layers.

In case of updating only a portion of a neural network, the processor 200 may reduce compile time by separately compiling a grouped layer that needs modification without recompiling the entire neural network.

The processor 200 may enhance compile performance by allowing additional optimization between layers compared to a layer-by-layer compile method.

The processor 200 may utilize parallel compilation to accelerate iteration in a framework that frequently requires a performance evaluation of a network configuration or an optimization technique such as profile-guided optimization (PGO) or a neural architecture search (NAS).

In an example of FIG. 19, among a plurality of grouped layers 1911, 1913, 1915, 1917 and 1919, in response to changes in a portion of layers included in the grouped layers 1913 and 1919, the processor 200 may include recompiling only on the grouped layers 1913 and 1919. The processor 200 may generate grouped layers 2013 and 2019 by performing recompiling. Grouped layers 2011, 2015, and 2017 may be identical to the grouped layers 1911, 1915, and 1917.

Figure 21:
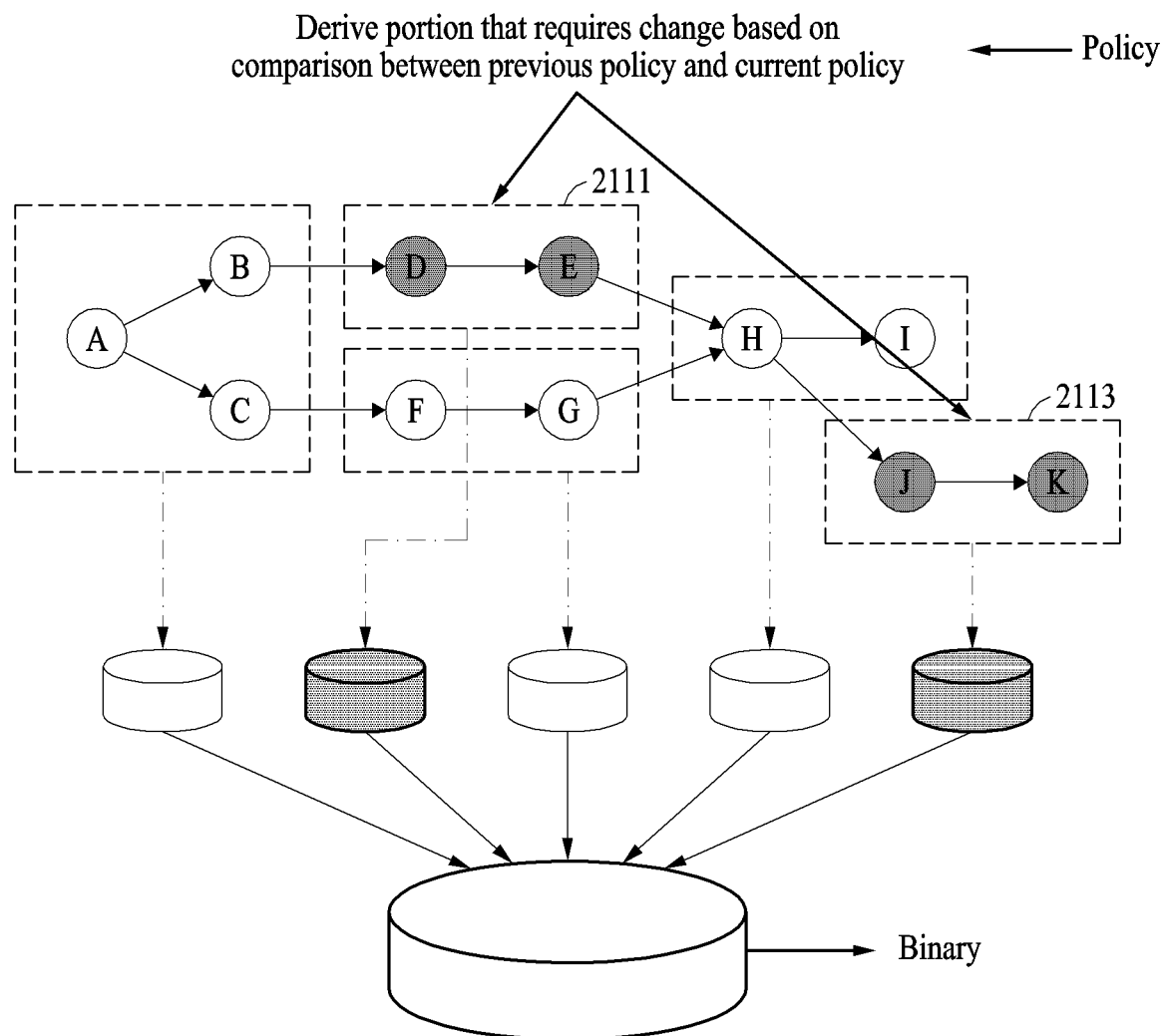
FIG. 21 illustrates an example of a process of deriving a group that requires a modification based on a policy in a process of profile-guided optimization.
Figure 22:
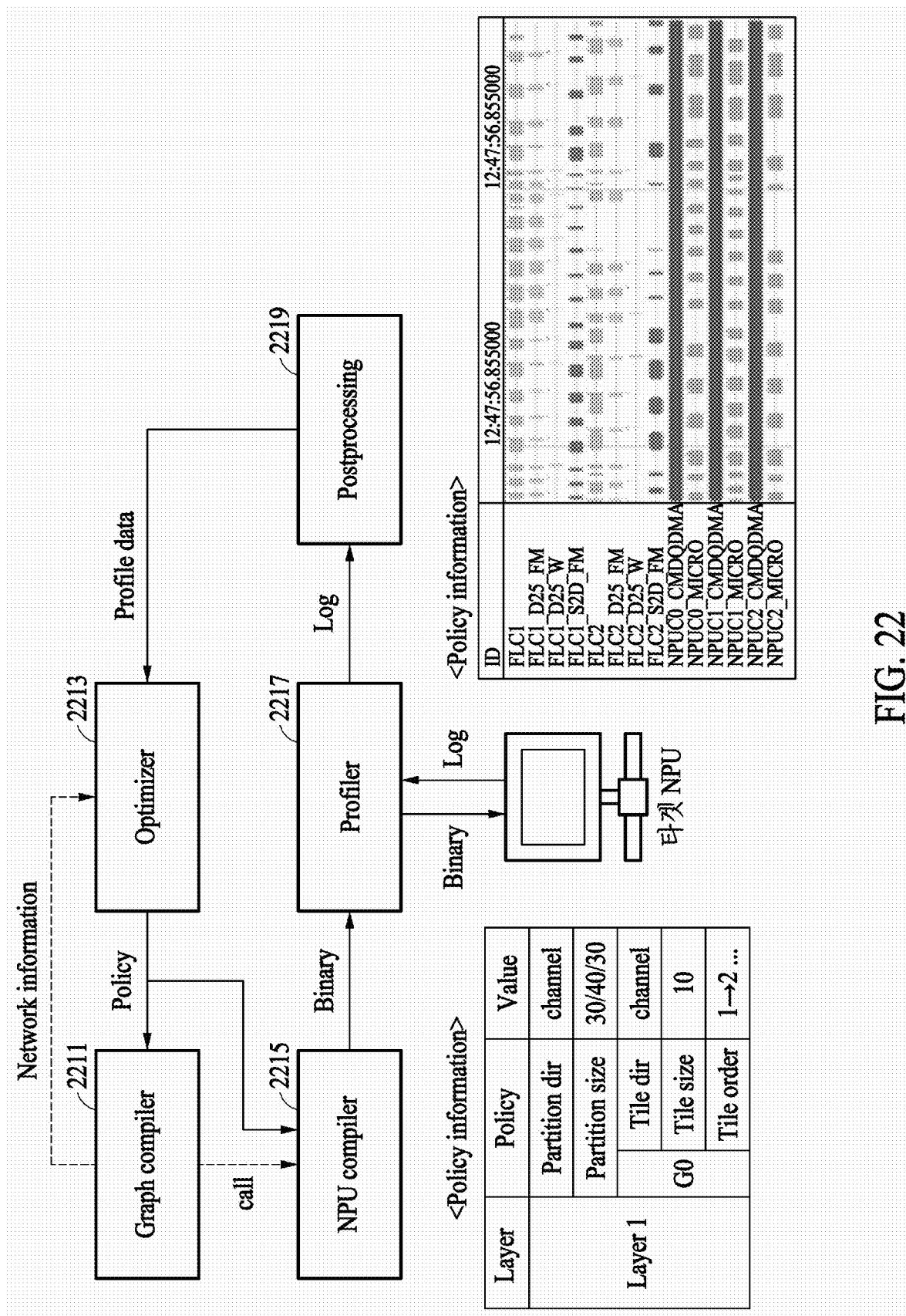
FIG. 22 illustrates an example of a profile-guided optimization framework.

FIG. 21 illustrates an example of a process of deriving a group that requires a modification based on a policy in a process of profile guided optimization, and FIG. 22 illustrates an example of a profile guided optimization framework.

Referring to FIGS. 21 and 22, a processor (for example, the processor 200 of FIG. 1) may perform compilation partially on a grouped layer which has a difference by comparing a previous optimization policy and an optimization policy (for example, a tiling method or execution order) determined in an optimizer 2213 in a PGO loop.

In an example of FIG. 21, the processor 200 may derive a grouped layer that needs modification by comparing a previous policy and a current policy. For example, when grouped layers 2111 and 2113 need modifications, the processor 200 may perform recompiling only on the grouped layers 2111 and 2113.

A graph compiler 2211 may perform compilation based on a policy received from the optimizer 2213 and may transmit a call message to a network processing unit (NPU) compiler 2215. The NPU compiler 2215 may generate binary and transmit the binary to a profiler 2217, and the profiler 2217 may generate a log based on the binary and transmit the log to a postprocessing module 2219.

The postprocessing module 2219 may output profile data to the optimizer 2213. The profiler 2217 may transmit the binary to a target NPU and may receive the log from the target NPU.

Figure 23:
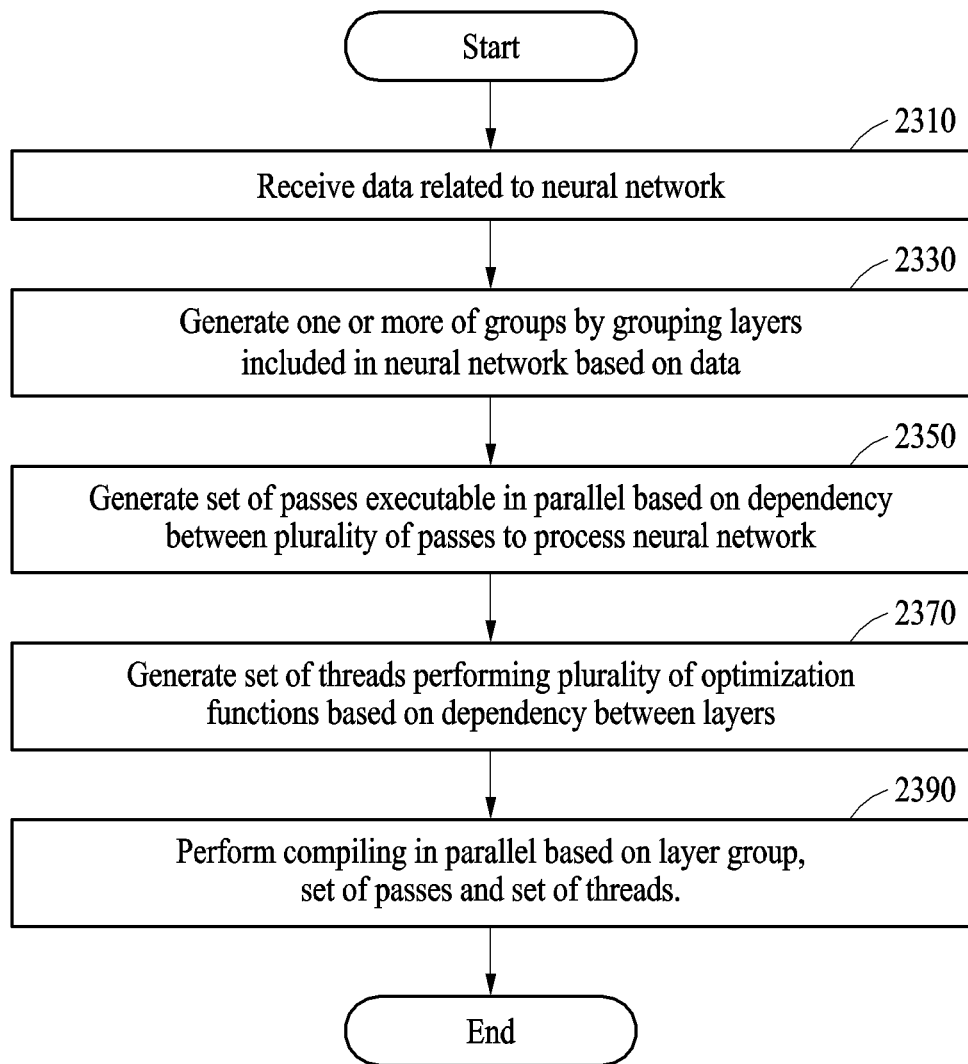
FIG. 23 illustrates an example of an operation of the compile apparatus of FIG. 1.

FIG. 23 illustrates an example of an operation of the compile apparatus of FIG. 1.

Referring to FIG. 23, in operation 2310, a receiver (for example, the receiver 100 of FIG. 1) may receive data related to a neural network. In operation 2330, a processor (for example, the processor 200 of FIG. 1) may generate a grouped layer by grouping layers included in the neural network based on the data related to the neural network. The processor 200 may generate a grouped layer based on dependency between layers. The processor 200 may generate a grouped layer by combining layers having dependency.

In operation 2350, the processor 200 may generate a set of passes executable in parallel based on dependency between a plurality of passes to process the neural network. The set of passes may be generated by combining passes having no dependency.

In operation 2370, the processor 200 may generate a set of threads performing a plurality of optimization functions based on the dependency between the layers. In response to a portion of layers having dependency, the processor 200 may generate a set of threads by parallelizing neural network operations. A thread may be a unit of flow executed in a predetermined program or a process.

In response to layers having no dependency, the processor 200 may generate a set of threads by parallelizing the layers in layer-by-layer. In response to layers having no dependency, the processor 200 may perform pass fusing for the passes. The processor 200 may generate a set of threads by applying multi-threading to an operation of weight compression of a neural network or an operation of weight preprocessing of the neural network.

In operation 2390, the processor 200 may perform compilation in parallel based on the grouped layer, the set of passes, and the set of threads. The processor 200 may generate an IR by performing compiling on the grouped layer. The processor 200 may perform compilation by inserting the IR generated when the second top-level network of the neural network is being compiled.

In response to a change in a portion of the layers, the processor 200 may perform recompiling on a grouped layer including the portion of the layers.

The compile apparatus 10, receiver 100, processor 200, memory 300, neural network 211, target device 216, main memory 212, multi-core CPU 213, and NPU 215 in FIGS. 1-23 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-23 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented compile method for a neural network, the compile method comprising:
   receiving data related to the neural network;
   generating a grouped layer by grouping layers comprised in the neural network based on the data;
   generating a set of passes executable in parallel based on a dependency between a plurality of passes to process the neural network;
   generating a set of threads performing a plurality of optimization functions based on whether optimization operations performed by the optimization functions is performed independently for the layers, respectively, or sequentially based on a dependency between the layers; and
   performing compilation in parallel based on the grouped layer, the set of passes, and the set of threads.

2. The compile method of claim 1, wherein the generating of the grouped layer comprises generating the grouped layer based on the dependency between the layers.

3. The compile method of claim 2, wherein the generating of the grouped layer based on the dependency between the layers comprises generating the grouped layer by combining layers having a dependency among the layers.

4. The compile method of claim 1, wherein the performing of the compiling comprises generating an intermediate representation (IR) by compiling the grouped layer; and
   inserting the IR when compiling a second top-level network of the neural network.

5. The compile method of claim 1, wherein the generating of the set of passes comprises combining passes having no dependency among the passes.

6. The compile method of claim 1, wherein the generating of the set of threads comprises:
   parallelizing neural network operations in response to a portion of the layers having dependency; and
   parallelizing each of the layers sequentially in response to the layers having no dependency.

7. The compile method of claim 1, wherein the generating of the set of threads comprises performing pass fusing on the passes of the layers having no dependency.

8. The compile method of claim 1, wherein the generating of the set of threads comprises applying multi-threading to an operation of weight compression of the neural network or an operation of weight preprocessing of the neural network.

9. The compile method of claim 1, further comprising:
   in response to a change in a portion of the layers, performing recompiling on a grouped layer comprising the portion of the layers.

10. A non-transitory computer-readable storage medium storing instructions that, when executed by one or more processors, cause the one or more processors to perform the compile method of claim 1.

11. A compile apparatus for a neural network, the compile apparatus comprising:
    a receiver configured to receive data related to the neural network; and
    a processor configured to
      generate a grouped layer by grouping layers comprised in the neural network based on the data,
      generate a set of passes executable in parallel based on a dependency between a plurality of passes to process the neural network,
      generate a set of threads performing a plurality of optimization functions based on whether optimization operations performed by the optimization functions is performed independently for the layers, respectively, or sequentially based on dependency between the layers, and
      perform compilation in parallel based on the grouped layer, the set of passes, and the set of threads.

12. The compile apparatus of claim 11, wherein the processor is further configured to generate the grouped layer based on the dependency between the layers.

13. The compile apparatus of claim 12, wherein the processor is further configured to generate the grouped layer by combining layers having a dependency among the layers.

14. The compile apparatus of claim 11, wherein the processor is further configured to
    generate an intermediate representation (IR) by compiling the grouped layer, and
    perform compilation by inserting the IR when compiling a second top-level network of the neural network.

15. The compile apparatus of claim 11, wherein the processor is further configured to generate the set of passes by combining passes having no dependency among the passes.

16. The compile apparatus of claim 11, wherein the processor is further configured to
- generate the set of threads by parallelizing neural network operations in response to a portion of the layers having a dependency, and
- generate the set of threads by parallelizing each of the layers sequentially in response to the layers having no dependency.

17. The compile apparatus of claim 11, wherein the processor is further configured to perform pass fusing on the passes of the layers having no dependency.

18. The compile apparatus of claim 11, wherein the processor is further configured to generate the set of threads by applying multi-threading to an operation of weight compression of the neural network or an operation of weight preprocessing of the neural network.

19. The compile apparatus of claim 11, wherein in response to a change in a portion of the layers, the processor is further configured to perform recompiling on a grouped layer comprising the portion of the layers.

\* \* \* \* \*